United States Patent [19]
Toh et al.

[11] Patent Number: 5,926,940
[45] Date of Patent: Jul. 27, 1999

[54] MANUFACTURING METHOD FOR STATOR OF MOTOR

[75] Inventors: Ryuji Toh, Toyota; Yasutomo Kawabata; Tetsuya Miura, both of Aichi-ken, all of Japan

[73] Assignee: Toyota Jidosha Kabushiki Kaisha, Toyota, Japan

[21] Appl. No.: 08/908,055

[22] Filed: Aug. 11, 1997

[30] Foreign Application Priority Data

Aug. 14, 1996 [JP] Japan .................................. 8-214488

[51] Int. Cl.⁶ .................................................. H02K 15/00
[52] U.S. Cl. ............................................................ 29/596
[58] Field of Search ........................... 242/432; 335/299; 29/596; 72/481, 217

[56] References Cited

U.S. PATENT DOCUMENTS

| | | | |
|---|---|---|---|
| 4,450,708 | 5/1984 | King | 72/481 |
| 4,587,824 | 5/1986 | Wiersema et al. | 72/217 |

FOREIGN PATENT DOCUMENTS

| | | |
|---|---|---|
| 63-194543 | 8/1988 | Japan . |
| 7-298528 | 11/1995 | Japan . |

*Primary Examiner*—David A. Scherbel
*Assistant Examiner*—Benjamin M. Halpern
*Attorney, Agent, or Firm*—Oblon, Spivak, McClelland, Maier & Neustadt, P.C.

[57] ABSTRACT

In a method for manufacturing a stator of a motor, when an angular line is used to increase the occupancy rate of line members for coil pieces inserted into slots, not-slot-inserted parts project from a stator core. This results in enlarging the size of a stator, and damaging coatings via interference between a coil piece and other parts. In order to solve these problems, an angular line is first wound a predetermined times. Then, slot-inserted parts (a coil side) are separately clamped, and one of them is rotated by 180 degrees in a direction perpendicular to the winding direction, so that twisted parts are formed on coil ends. The coil sides are sequentially inserted into predetermined slots while maintaining respective twisted parts substantially parallel to each other, until a stator is completed.

2 Claims, 5 Drawing Sheets

MANUFACTURING METHOD FOR STATOR OF MOTOR

BACKGROUND OF THE INVENTION

1. Field of the Invention

The present invention relates to an improved method for manufacturing a stator of a motor in which a plurality of coil pieces are sequentially inserted into a stator core.

2. Description of the Prior Art

A stator of a motor is generally formed by successively winding an enameled coil wire member 101 around a stator core 102 as shown in FIG. 1. A stator core 102 is made by laminating a plurality of ring steel plates 102 as shown in FIG. 2. On the inner circumference of the stator core 102, there are formed a plurality of slots 103 extending along the axis of the stator core 102. A coil wire member 101 is wound around the stator core 102 such that it passes through any of the slots 103, thereby forming a coil. Recently, motor stators have begun to be generally manufactured in a method different from the above. That is, a coil wire member 101 is wound beforehand around a die, or the like, a predetermined number of times to thereby form a coil shaped coil piece, and the coil piece is then inserted into one of the slots 103.

With electric current being transmitted through the coil wire member 101, a magnaflux is generated in the direction piercing the coil, driving the rotation of a rotor (not shown). Note that a part of a coil to be inserted into a slot 103 (a slot-inserted part) is referred to as a coil side 101a, while that connecting a pair of coil sides 101a is referred to as a coil end 101b.

In order to realize a high-output motor with a stator such as above, it has been desired to efficiently dispose coil wire members 101 in respective slots 103. For this purpose, a coil wire member having a rectangular cross section (i.e., a flat angular line), instead of a conventional circular cross section, has been proposed, so that adjacent coil wire members 101 can firmly contact each other on their flat sides. With this arrangement, a coil wire member 101 can be wound around a stator core 102 with less resulting space between adjacent windings. As a result, a tightly packed coil wire member can be highly efficiently disposed in slots 103. Moreover, in a method using a pre-formed coil piece, employment of an angular line to form a coil piece will attain the same effect.

However, a coil wire member having a rectangular cross section has higher rigidity than a coil wire member having a circular cross section. This resultantly gives wider curvature to coil ends, which thus project in the axial direction of the stator core. Worse, when coils are sequentially inserted into slots, straddling a predetermined number of slots as shown in FIG. 1, the equivalent number of coil ends to that of the straddled slots are overlapped to one another, significantly projecting in the diameter direction of the stator. This results in enlarging the size of a stator, and, by continuation, a motor using such a large stator.

Further, significantly projecting coil ends in the diameter direction of a stator core have adverse effects on the workability in assembling a coil. In addition, due to such large projection, the projected coil ends excessively contact an adjacent coil. This may bring about coating damage and resultant in insulation damage.

SUMMARY OF THE INVENTION

The present invention has been conceived to overcome the above problems and aims to provide a method for manufacturing a stator of a motor, in which coil pieces are efficiently disposed in slots, and the size of a motor is reduced because projection of a part of a coil not being inserted into a slot (a not-slot-inserted part) is reduced. Further, it also aims to provide a method for manufacturing a stator of a motor which allows easy assembling of coil pieces into slots with less interference with respect to the coil pieces.

In order to achieve the above object, the present invention provides a method for manufacturing a stator of a motor in which coil pieces are sequentially inserted each into two slots straddling a predetermined number of slots on a stator core of a motor, the coil pieces being formed beforehand and the stator core having a plurality of slots formed thereon, comprising steps of: forming coil pieces by winding angular lines into the shape of a coil; forming twisted parts on the coil pieces by twisting not-slot-inserted parts of the coil pieces by a predetermined angle; and inserting not-twisted parts of the coil pieces sequentially into the slots such that the twisted parts thereof are disposed substantially parallel to each other.

In another aspect, the present invention provides a method for manufacturing a stator of a motor in which coil pieces are sequentially inserted each into two slots as straddling a predetermined number of slots on a stator core of a motor, the coil pieces being formed beforehand and the stator core having a plurality of slots formed thereon, comprising steps of: forming coil pieces by winding a bundled wire consisting of a bundle of thin angular lines into the shape of a coil; forming twisted parts on the coil pieces by twisting not-slot-inserted parts of the coil pieces by a predetermined angle; and inserting not-twisted parts of the coil pieces sequentially into the slots such that the twisted parts thereof are disposed substantially parallel to each other.

In the above aspects, a not-slot-inserted part is twisted by, for instance, 180 degrees, though the twisting angle must be adjusted depending on the shape of a coil piece, the number of windings per angular line, and so forth.

With this arrangement, the extent of the projection of twisted parts from a stator core can be reduced since the not-slot-inserted parts, i.e., twisted parts, are inclined in the axial direction of the stator core. This enables reduction of stator size. Also, twisted parts can be efficiently and compactly disposed, as they are disposed substantially parallel to each adjacent part. This parallel disposition is also effective in reducing interference between coil pieces so that coating damage of angular lines can be prevented, and is effective in improving the workability in attaching coil pieces to a stator core.

It should also be noted that a not-slot-inserted part is given higher flexibility when a bundled wire is used. This resultantly facilitates formation of coil pieces in compact and further enhances the workability in assembly.

According to another aspect, in the above manufacturing method, a longer angular line is allotted to an outer line of each of the twisted parts than an inner line thereof.

With this arrangement, it is possible to compensate for the difference in length between the lines in outer and inner paths of a twisted part, caused by twisting a not-slot-inserted part, so that respective angular lines in a twisted part will stay firmly contacted each other without being apart. This enables efficient, compact disposition of twisted parts, as well as enhanced workability in installing coil pieces to a stator core.

According to another aspect, in the above manufacturing method, slot-inserted parts on both sides of each of the coil pieces are separately clamped, and are then rotated such that they are directed in opposite directions from each other to thereby form twisted parts on the not-slot-inserted parts.

With this arrangement, only a not-slot-inserted part is securely twisted; a slot-inserted part is not twisted.

According to another aspect, the above manufacturing method further comprises a step of forming a flexible part and a non-flexible part in the bundled wire by fixedly adhering a part of the bundled wire corresponding to a slot-inserted part only.

Welding, crimping, heat curing resin, or so forth are employed for adhering.

With this arrangement, slot-inserted parts can be efficiently inserted into slots and tightly packed, while a not-slot-inserted part retains its flexibility.

BRIEF DESCRIPTION OF THE DRAWINGS

The above and the other objects, features, and advantages, will become further apparent from the following description of the preferred embodiment taken in conjunction with the accompanying drawings wherein.

DESCRIPTION OF THE PREFERRED EMBODIMENTS

Figure 3:
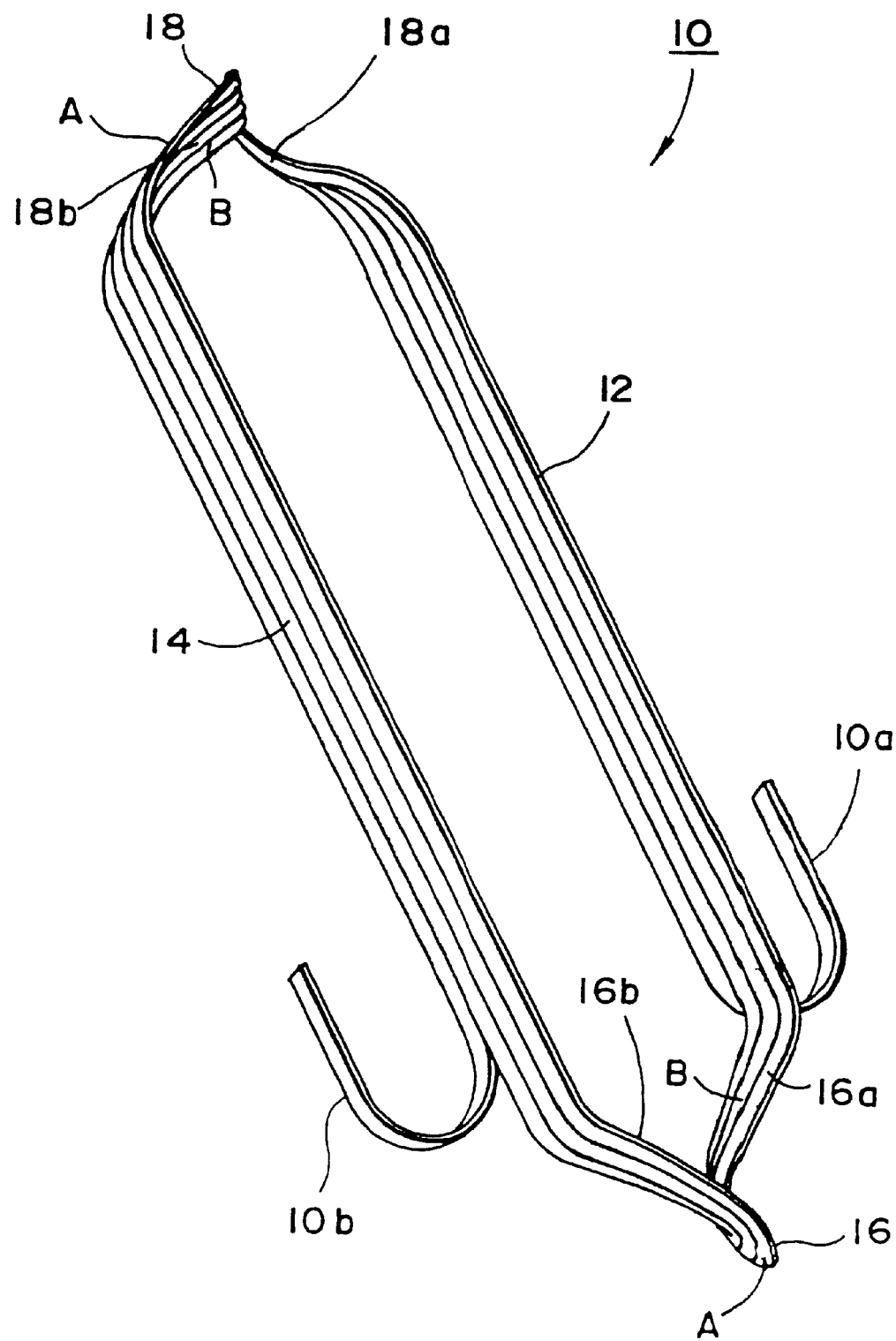
FIG. 3 is a perspective view of a coil piece used in a stator manufacturing method in a preferred embodiment of the present invention.
Figure 4:
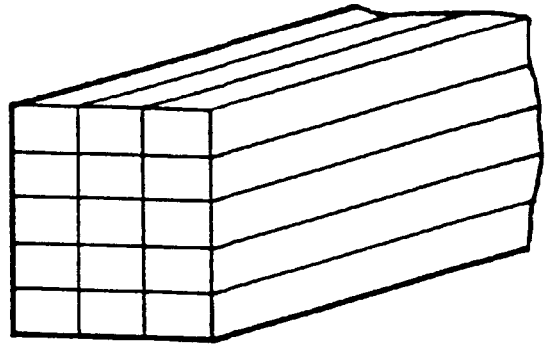
FIG. 4 is a diagram showing an example of an angular line, which is a bundled wire, used for forming a coil piece in the preferred embodiment of the present invention.

In the following, a preferred embodiment of the present invention will be described based on the accompanying drawings. FIG. 3 is a perspective view showing a coil piece 10 to be inserted into a slot 103 on a stator core (see FIG. 1). This coil piece 10, perhaps made mostly of copper, is formed by winding an enameled a single wire having a predetermined cross sectional area (for instance, 3 mm ×2 mm) a predetermined number of times. Alternatively, it may be formed by winding a bundled wire at a predetermined number of times, as shown in FIG. 4, the bundled wire being a bundle of enameled thin lines having the same predetermined cross sectional area as the above (for instance, 3 mm×2 mm). For brevity of the drawings, a wire member is wound three times in this embodiment, though the suitable number of times for winding will vary depending on motor capability.

Figure 1:
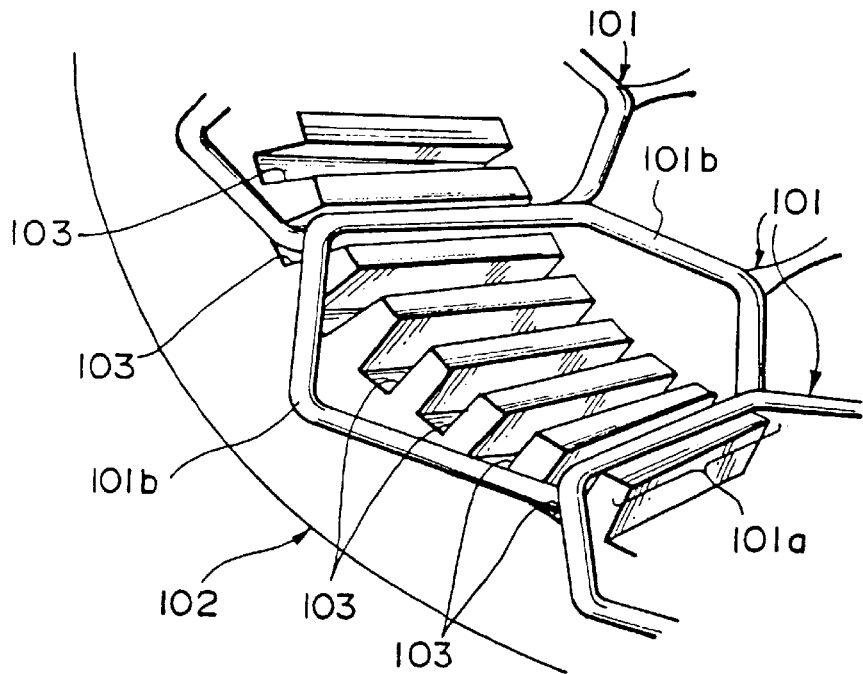
FIG. 1 is a diagram explaining a conventional stator manufacturing method in which a coil member is wound around a stator core.
Figure 2:
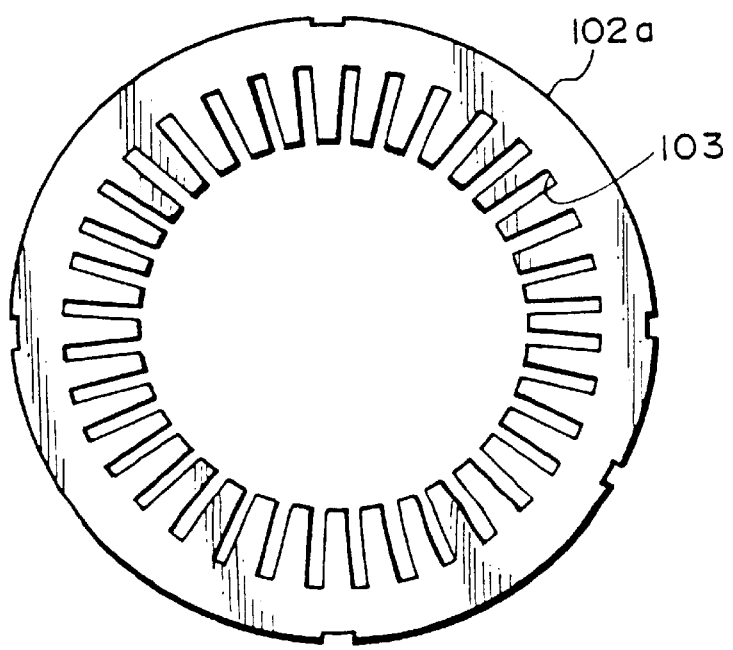
FIG. 2 is a diagram showing the shape of a stator core.

A coil piece 10 comprises slot-inserted parts (hereinafter referred to as a coil side) 12, 14, and not-slot-inserted parts (hereinafter referred to as a coil end) 16, 18. Coil sides 12, 14 are formed having a predetermined interval between each other so that they are inserted into respective slots 103 with a predetermined number of slots 103 straddled in between. This is the same as a coil piece used in the conventional manner as shown in FIG. 1. The coil sides 12, 14 are connected to each other by a coil end 16, 18. The coil ends 16, 18 are each twisted at its substantial center part, thereby forming a twisted part. The twisted part accompanies slopes 16a, 16b, 18a, 18b on its both sides, which are formed continuous to the twisted part.

Figure 5:
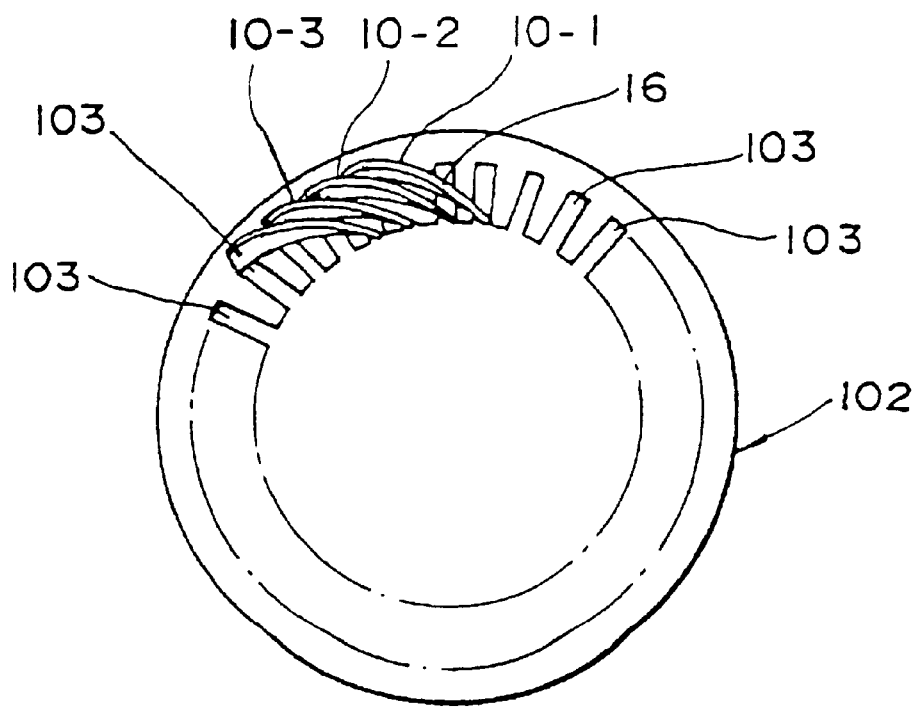
FIG. 5 is a diagram showing a state in which coil pieces are inserted according to the stator manufacturing method of the preferred embodiment of the present invention.

The thus formed coil pieces 10 are sequentially inserted into slots 103 on the stator core 102 in the manner shown in FIG. 5. To be specific, a coil piece 10-1 is initially inserted into a predetermined slot 103, followed by a coil piece 10-2 to be inserted into the adjacent slot 103. In this event, the coil piece 10-2 is inserted such that the front sides of the slopes 16a, 16b thereof are disposed substantially parallel to the back sides of the slopes 16a, 16b of the coil piece 10-1. Subsequently, a coil piece 10-3 is inserted, similar to the above, such that the front sides of the slopes 16a, 16b thereof are disposed substantially parallel to the back sides of the slopes 16a, 16b of the coil piece 10-2. As a result of successive disposition of coil pieces in this manner, overlapped parts of coil ends 16 with respect to the diameter direction of the stator core 102 are sequentially slid into a circumferential direction thereof and are inclined with respect to the radial direction of the stator core, so that the extent of the projection of coil ends 16 from the surface of the stator core 102 is reduced.

Further, in the arrangement wherein the front and back sides of respective slopes 16a, 16b relative to the coil ends 16 of adjacent coil pieces 10 are disposed substantially parallel to each other, the interval between adjacent slots 103 is preserved intact as an interval between adjacent coil ends 16. This will eliminate interference between coil pieces 10. With no interference occurred between coil pieces 10, a coil piece 10 will be less pressed by the edge of an adjacent stator core 102, so that coating damage, and thus insulation damage, can be greatly reduced. In addition, coil pieces can be easily assembled when they are sequentially disposed such that their coil ends 16 are inserted substantially parallel to each other. Note that although FIG. 5 shows coil ends 16 sides only, coil ends 18 sides are similarly arranged.

When using a bundled wire, as shown in FIG. 4, respective thin lines are adhered to one another only on coil sides 12, 14 by means of welding or heat curing resin, etc., while those at coil ends 16, 18 are left as a bundle of thin lines. With this arrangement, the flexibility of a bundled wire can be preserved at coil ends 16, 18, so that the coil ends 16, 18 can be easily twisted and their curvature can be thus suppressed small. This contributes to reducing the extent of the projection of coil ends 16, 18.

As described above, when the coil sides 12, 14 of respective coil pieces 10 are sequentially inserted into slots 103 such that their twisted parts are disposed substantially parallel to each other, the coil ends 16, 18 will project from the stator core 102 less. This is effective in reducing stator size.

Methods for manufacturing a coil piece and of a stator according to the present invention will be described, referring to FIGS. 6A to 6D.

Figure 6A:
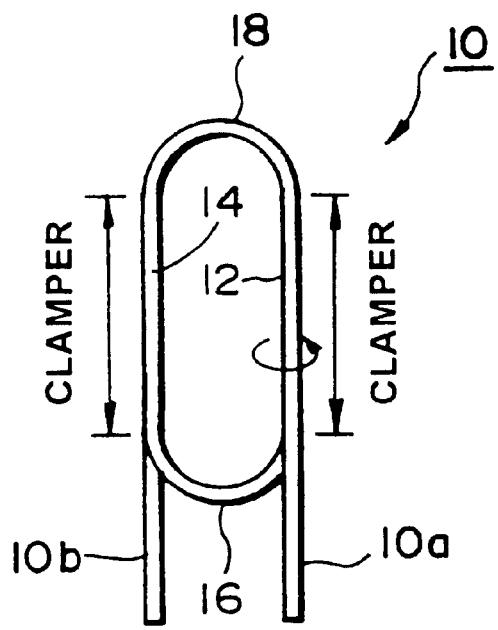
FIG. 6A is a plane view showing a state before coil pieces are twisted in the preferred embodiment of the present invention.
Figure 6B:
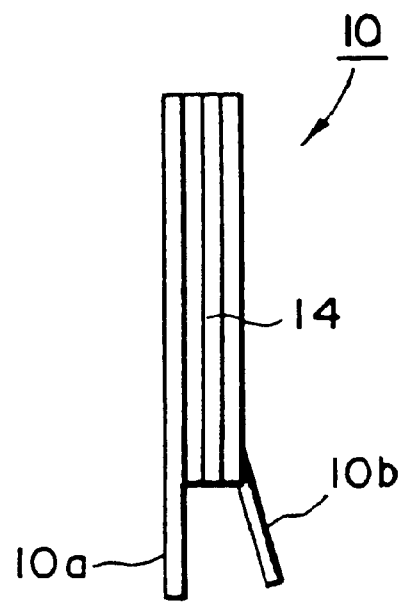
FIG. 6B is a side view corresponding to FIG. 6A.

As mentioned above, an angular line of a single wire having a predetermined cross sectional area, or an equivalent a bundled wire, is wound a predetermined number of times to thereby form a coil piece 10 of a basic type as shown in FIG. 6A. One of the coil ends 10a, 10b of this coil piece 10 projects on the upper side of the coil piece 10, and the other on the lower side, as shown in FIG. 6B.

Figure 6C:
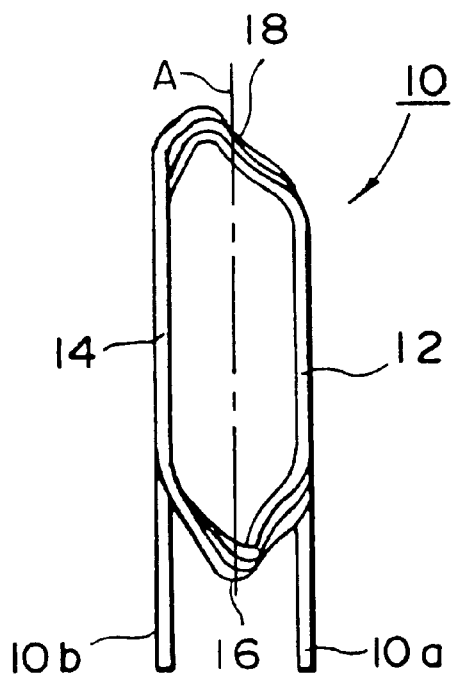
FIG. 6C is a plane view showing a state in which coil pieces has been twisted in the preferred embodiment of the present invention.
Figure 6D:
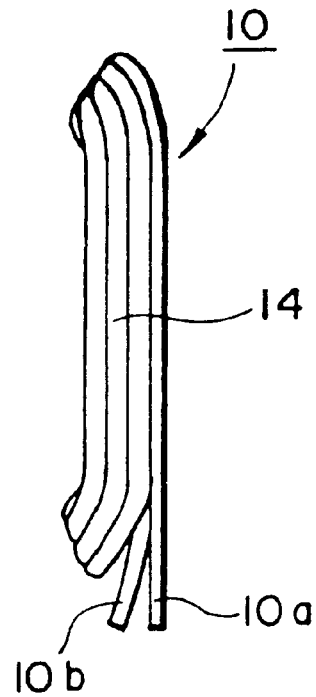
FIG. 6D is a side view corresponding to FIG. 6C.

Referring again to FIG. 6A, straight line parts of the coil piece 10, i.e., coil sides 12, 14, are separately grasped by, for example, a clamper. Then, the coil side 12, for instance, is rotated by a predetermined angle, such as about 180 degrees, in the direction perpendicular to the winding direction of the coil (in this example, perpendicular to the drawing) as shown by an arrow in FIG. 6A. In this event, curved parts of the coil piece 10, i.e., coil ends 16, 18, will be twisted, as the coil sides 12, 14 are grasped by a damper (not shown). The coil piece 10 is resultantly deformed into the shape as shown in FIG. 6C, in which coil ends 10a, 10b both project on one side of the coil piece 10. As seen in FIG. 6C, the coil ends 16, 18 are thus twisted so as to be asymmetric relative to a line A extending between slot inserted parts of the coil pieces and parallel to an axial direction of the stator core.

After coil pieces 10 were formed into a predetermined shape as above, coil sides 12, 14 thereof are sequentially inserted into corresponding slots 103 such that the twisted parts thereof are disposed substantially parallel to each adjacent part until a stator is completed.

In the aforementioned formation of a coil piece 10, attention must be paid to the following considerations. That is, when a coil piece 10 is twisted, an angular line passing in the outermost path A at the twisted part and that in the innermost path B are caused to have different lengths as shown in FIG. 3; the former is longer than the latter. In other words, since twisting causes imbalance in the length of the lines between in the outermost path A and in the innermost path B, when the coil ends 16, 18 are formed using angular lines of the same length, firm contact among respective line members at the twisted part cannot be preserved due to the imbalance caused.

Figure 7:
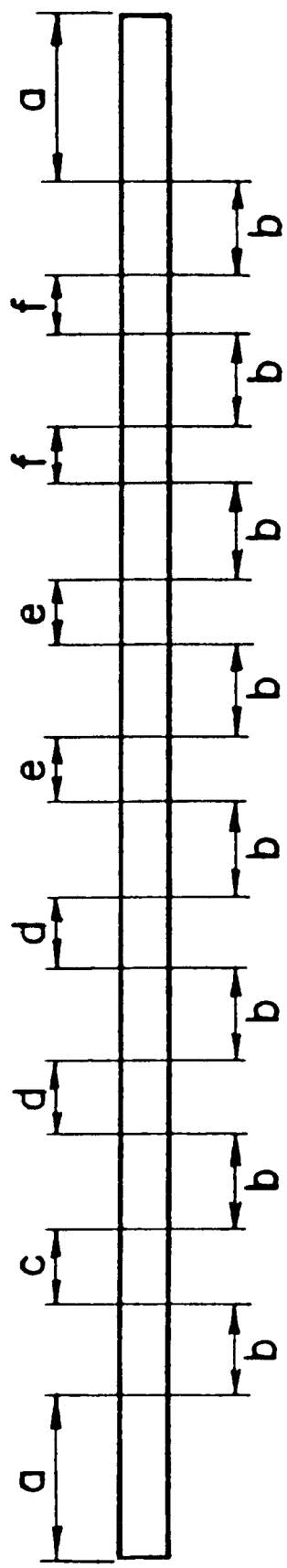
FIG. 7 is a diagram explaining length allocation of a line so as to adjust the length of the parts of a line, not to be inserted into a slot in the preferred embodiment of the present invention.

In order to solve this problem, an angler line is properly allocated before being wound, as shown in FIG. 7, such that the parts corresponding to outer paths have longer length than that corresponding to inner paths.

To be specific, referring to FIGS. 3 and 7, the length of a line end 10a is defined as a; that of the part of a line to be formed into a coil side 12 as b; that into a coil end 18 in the outermost path A as c; that into a coil side 14 as b; that into a coil end 16 in the outermost path A as d; that into a coil side 12 in the second round as b; and so forth. In this way, a part of a line to be placed closer to the innermost path B in a twisted part is given a shorter length such that f is shorter than e, and so forth. By using a line subjected to the above length adjustment in advance, it is possible to form a coil piece in which the imbalance in length caused by twisting is offset, and respective angular lines in a twisted part stay fixedly contacting each other, instead of being apart. This allows efficient and compact disposition of twisted parts.

Further, since lines firmly contact each other at coil ends 16, 18, workability in assembling coil pieces into a stator core is improved. Note that the lengths c-d, d-e, and e-f may all differ by about 10 mm, though the extent of the difference varies depending on the twisting angle of a coil piece or the number of straddled slots, etc.

For a bundled wire, length allocation as shown in FIG. 7 may be made when the parts of a line to be formed into slot-inserted parts, each having length b, are welded or crimped. When using a bundled wire consisting of a bundle of thin angular lines, the aforementioned length adjustment is effective also to prevent separation of thin angular lines.

It should be noted that a step of winding and that of forming twisted parts may be performed at the same time, though they have been carried out separately in the above. To be specific, a die to be used for winding an angular line is formed so as to include twisted parts. Using such a die, winding of a line and formation of twisted parts can be achieved simultaneously. This manner of formation enables producing a compact coil piece having straight lines firmly in contact, as the imbalance in length is not caused by twisting.

Also, although coil pieces are wound separately by lines in the above, two or three coil pieces may be wound by one line, wherein the line end 10a or 10b is connected to that 10b or 10a of a line which is wound around an adjacent coil piece.

What is claimed is:

1. A method for manufacturing a stator of a motor in which coil pieces are sequentially inserted each into two slots straddling a predetermined number of slots on a stator core of a motor, the coil pieces being formed beforehand and the stator core having a plurality of slots formed thereon, comprising steps of:

forming coil pieces by winding angular lines into the shape of a coil;

twisting not-slot-inserted parts of the coil pieces such that the not-slot-inserted parts are asymmetric relative to a line extending between slot inserted parts of the coil pieces and extending parallel to an axial direction of the stator core; and inserting not-twisted parts of the coil pieces sequentially into the slots such that the twisted parts thereof are disposed substantially parallel to each other.

2. A method for manufacturing a stator of a motor in which coil pieces are sequentially inserted each into two slots straddling a predetermined number of slots on a stator core of a motor, the coil pieces being formed beforehand and the stator core having a plurality of slots formed thereon, comprising steps of:

forming coil pieces by winding a bundled wire consisting of a bundle of thin angular lines into the shape of a coil;

twisting not-slot-inserted parts of the coil pieces such that the not-slot-inserted parts are asymmetric relative to a line extending between slot inserted parts of the coil pieces and extending parallel to an axial direction of the stator core; and inserting not-twisted parts of the coil pieces sequentially into the slots such that the twisted parts thereof are disposed substantially parallel to each other.

* * * * *